(12) United States Patent
Raniere (10) Patent No.: US 8,189,768 B2
(45) Date of Patent: May 29, 2012

(54) SECURE MESSAGING

(75) Inventor: Keith A Raniere, Clifton Park, NY (US)

(73) Assignee: First Principles, Inc., Albany, NY (US)

( * ) Notice: Subject to any disclaimer, the term of this patent is extended or adjusted under 35 U.S.C. 154(b) by 1063 days.

(21) Appl. No.: 11/931,720

(22) Filed: Oct. 31, 2007

(65) Prior Publication Data

US 2009/0113204 A1    Apr. 30, 2009

(51) Int. Cl.
*H04K 1/00* (2006.01)
*H04L 9/00* (2006.01)
*H04L 9/28* (2006.01)

(52) U.S. Cl. ........................................................ 380/28

(58) Field of Classification Search ...................... 380/28
See application file for complete search history.

(56) References Cited

U.S. PATENT DOCUMENTS

| | | | |
|---|---|---|---|
| 4,223,182 A | 9/1980 | Fraser | |
| 4,584,685 A | 4/1986 | Gajjar | |
| 5,438,621 A | 8/1995 | Hornak et al. | |
| 5,519,696 A | 5/1996 | Willmann et al. | |
| 5,640,414 A | 6/1997 | Blakeney, II et al. | |
| 5,719,937 A | 2/1998 | Warren et al. | |
| 5,727,062 A | 3/1998 | Ritter | |
| 5,781,545 A * | 7/1998 | Matthew | 370/389 |
| 5,974,141 A | 10/1999 | Saito | |
| 6,035,397 A | 3/2000 | Campinos et al. | |
| 6,058,479 A | 5/2000 | Sorhaug et al. | |
| 6,067,416 A | 5/2000 | Fraser | |
| 6,091,710 A | 7/2000 | Mawhinney | |
| 6,094,145 A | 7/2000 | Vilain et al. | |
| 6,233,338 B1 | 5/2001 | Leppek | |
| 6,243,469 B1 | 6/2001 | Kataoka et al. | |
| 6,286,103 B1 | 9/2001 | Maillard et al. | |
| 6,289,455 B1 | 9/2001 | Kocher et al. | |
| 6,298,400 B1 | 10/2001 | Candelore | |
| 6,304,262 B1 | 10/2001 | Maloney et al. | |
| 6,745,231 B1 * | 6/2004 | Megiddo | 709/206 |
| 7,107,445 B2 * | 9/2006 | Trapp et al. | 713/150 |
| 2002/0080888 A1 * | 6/2002 | Shu et al. | 375/295 |
| 2003/0167342 A1 | 9/2003 | Munger et al. | |
| 2004/0107286 A1 | 6/2004 | Larson et al. | |
| 2006/0215593 A1 | 9/2006 | Wang et al. | |

* cited by examiner

*Primary Examiner* — Kambiz Zand
*Assistant Examiner* — Stephen Sanders
(74) *Attorney, Agent, or Firm* — Schmeiser, Olsen & Watts, LLP (57) ABSTRACT

A method for secure communication of a message. The method includes providing a message including a plurality of message packets, providing a nodal network including a plurality of nodes, where nodal operations are capable of execution on the message packets at the nodes, gaining, by a first node of the network, a first message packet, processing the first message packet by the first node, relinquishing the first message packet as processed by the first node, gaining, by any other node of the network, at least one other message packet, processing the other message packet by the other node, relinquishing the other message packet as processed by the other node, receiving, by a message destination node of the network, a first message packet, receiving, by the message destination node, at least a second message packet, and processing the first message packet and the second message packet to provide a reproduced message.

28 Claims, 6 Drawing Sheets

SECURE MESSAGING

BACKGROUND OF THE INVENTION

1. Technical Field

The present invention relates to secure transmission of a message within a nodal network.

2. Related Art

Security of a message transmitted over the Internet from a first node to a second node of the Internet may be of concern. Thus the message may be encrypted to prevent an uninvited third-party eavesdropper from learning of the substantive content of the message. Unfortunately, the uninvited third-party eavesdropper may be sophisticated enough to access and encrypt the message. Thus, there is a need for improved security for protecting a message transmitted over the Internet from a first node to a second node of the Internet.

SUMMARY OF THE INVENTION

A first aspect of the present invention provides method for secure communication of a message, comprising:

providing a message comprising a plurality of message packets;

providing a nodal network comprising a plurality of nodes, wherein nodal operations are capable of execution on said message packets at said nodes;

gaining, by a first node of said nodal network, a first message packet;

processing the first message packet by the first node;

relinquishing the first message packet as processed by the first node;

gaining, by any other node of said nodal network, at least one other message packet;

processing the at least one other message packet by said any other node;

relinquishing the at least one other message packet as processed by said any other node;

receiving, by a message destination node of said nodal network, a first message packet;

receiving, by the message destination node, at least a second message packet; and processing the first message packet and the at least a second message packet to provide a reproduced message.

A second aspect of the present invention provides a nodal network for secure communication of a message, said nodal network comprising a plurality of nodes, said message including a first message packet and at least one other message packet, said plurality of nodes comprising a first node, said first node adapted to gain the first message packet as encrypted and to process the first message packet; and reproducing the message.

A third aspect of the present invention provides a method for secure communication of a message, comprising:

receiving, by a first node of a plurality of nodes of a nodal network, a first true message that has been transmitted from a second node of the plurality of nodes, wherein the second node has also transmitted a first dummy message to a node selected from the group consisting of the first node, a third node of the plurality of nodes, and a combination thereof;

processing, by the first node, the first true message; and reproducing the true message.

The present invention provides improved security for protecting a message transmitted from a first node to a second node within a nodal network.

DETAILED DESCRIPTION OF THE INVENTION

Figure 1:
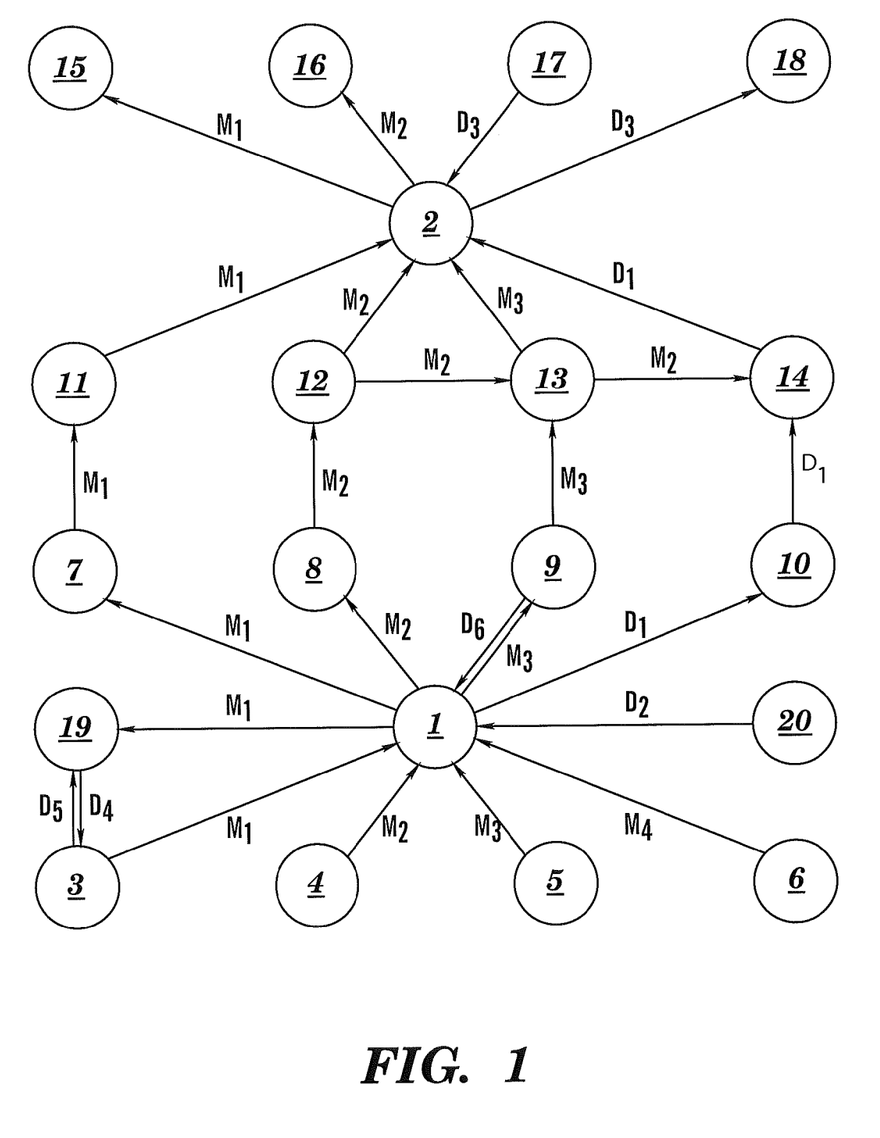
FIG. 1 depicts a nodal network with message packets and dummy packets transmitted between nodes of the nodal network, in accordance with embodiments of the present invention.

FIG. 1 depicts a nodal network 100, in accordance with embodiments of the present invention. The nodal network 100 comprises nodes 1-20, wherein any one of nodes 1-20 may communicate with any other of nodes 1-20 over a data communication path of the nodal network 100. The nodal network 100 may be of any communication medium type such as, inter alia, an Internet nodal network, a postal nodal network, a parcel nodal network a wireless nodal network, a vehicle communication network, an animal communication system, a multimedia nodal network, etc. An Internet nodal network may be embodied, inter alia, in an E-Mail communication system. A postal nodal network may be embodied in the United States Postal System. A parcel nodal network may be embodied in a package transport service such as, inter alia, United Parcel Service, Airborne Express, etc. A wireless nodal network may be embodied in, inter alia, a satellite communication system. A vehicle communication network may be embodied in, inter alia, message transport via taxicab, truck, train, boat, spacecraft (e.g., nodes may be distributed on different planets). An animal communication system may include, inter alia, message transport via horses, camels, donkeys, carrier pigeons, etc. A multimedia nodal network includes a plurality of communication media. In a multimedia nodal network, for example, communication between or among some nodes may be via the Internet, while communication between or among other nodes may be via the United States Postal System. In summary, the scope of the nodal network 100 of the present invention includes any and all communication media, individually or in combination.

The nodes 1-20 of the nodal network 100 may be located anywhere such as, inter alia: in a business office, in a residence, anywhere on the surface of planet Earth including on land or water (e.g., the Atlantic Ocean); in an airplane; ship, or spacecraft; underwater; underground; on any planet (e.g., Mars) of our local solar system; on any planet or other body in our galaxy, etc.

The messages of the present invention may be represented in any format or "modality" such as, inter alia, a text modality, a visual modality, an audio modality, or combinations thereof. The text modality denotes an expression of information in terms of written language (e.g., words, sentences, numbers, symbols, etc.). The visual modality includes, inter alia, a video modality (e.g., a feed or stream of video frames) and a graphics modality (i.e., synthetic imagery such as any synthetic graphics representation of information such as a graph, a pictorial bit pattern, etc.). The audio modality denotes an expression of information in terms of sound such as, inter alia, speech, music, etc. A message could include multiple modalities. For example, a first portion of the message could be expressed in a text modality and a second portion of the message could be expressed in an audio modality. As another example, a first portion of the message could be expressed in a text modality and a second portion of the message could be expressed in a visual (e.g., graphics) modality. If the message has multiple modalities then the different modalites could be transmitted from a first node to a second node over a same communication medium (e.g., the Internet) or over different communication media. As an example of transmission over different communication media, a first portion of the message expressed in a text modality could be transmitted over Internet nodes, while a second portion of the message expressed in an audio modality (e.g., expressed on an audio tape) could be transmitted over parcel nodes.

FIG. 1 illustrates transmitting a message from node 1 to node 2, with security protection by use of packetization and encryption. FIGS. 2A-2B, 3A-3B, 4A-4B, and 5A-5B illustrate how packetization and encryption may be combined, in accordance with embodiments of the present invention.

Figure 2A:
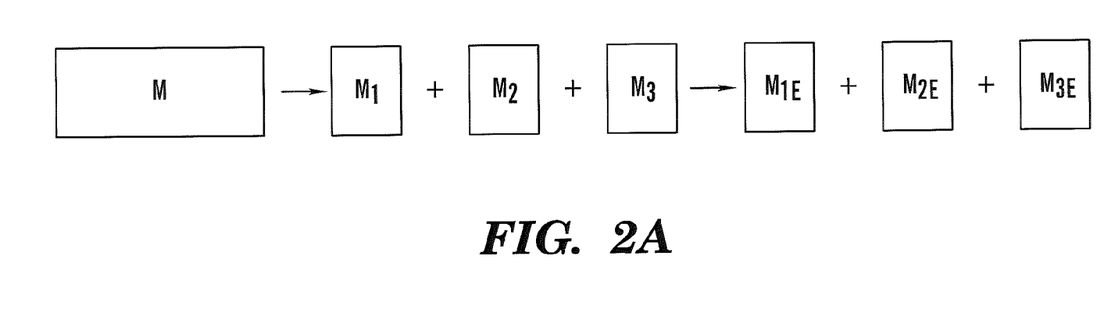
FIG. 2A depicts transformation of a message into encrypted packets, in accordance with embodiments of the present invention.
Figure 2B:
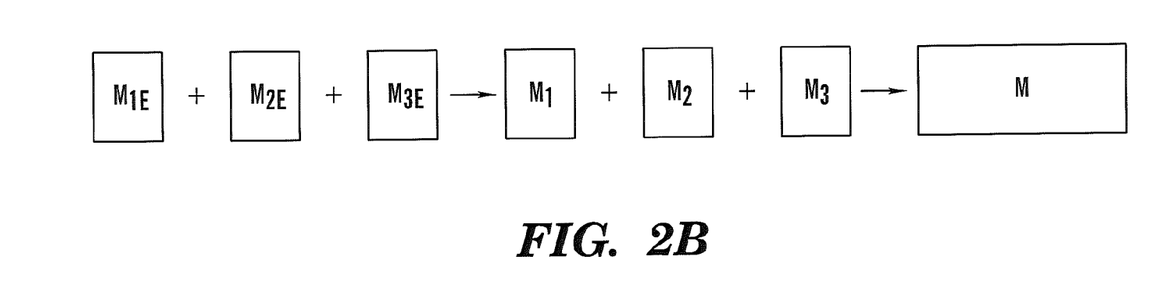
FIG. 2B depicts transformation of the encrypted packets of FIG. 2A into the message of FIG. 2A, in accordance with embodiments of the present invention.

In FIG. 2A, a message M is packetized into message packets $M_1$, $M_2$, and $M_3$. Then the packets $M_1$, $M_2$, and $M_3$ are respectively encrypted into the encrypted packets $M_{1E}$, $M_{2E}$, and $M_{3E}$. In FIG. 2B, the process of FIG. 2A is reversed such that the encrypted packets $M_{1E}$, $M_{2E}$, and $M_{3E}$ are respectively decrypted into the packets $M_1$, $M_2$, and $M_3$. Then the packets $M_1$, $M_2$, and $M_3$ in FIG. 2B are synthesized into the message M.

Figure 3A:
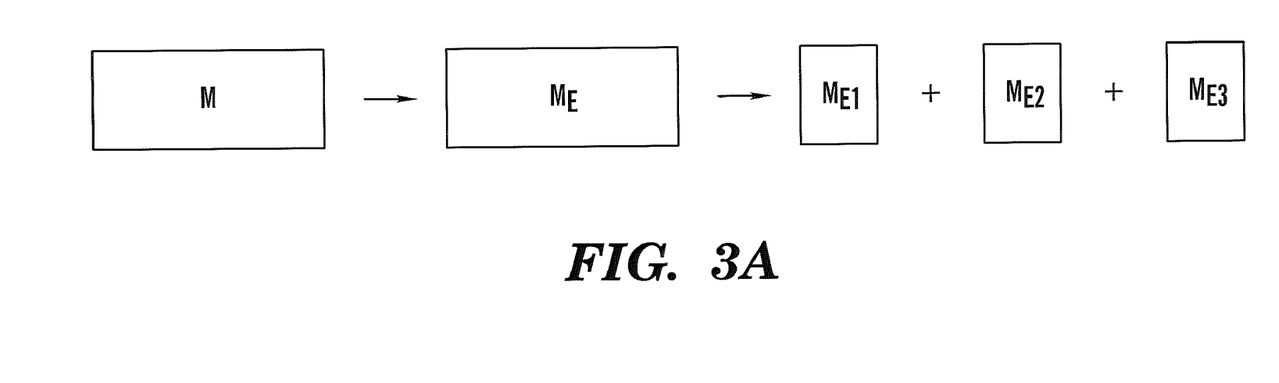
FIG. 3A depicts transformation of a message into encryption packets, in accordance with embodiments of the present invention.
Figure 3B:
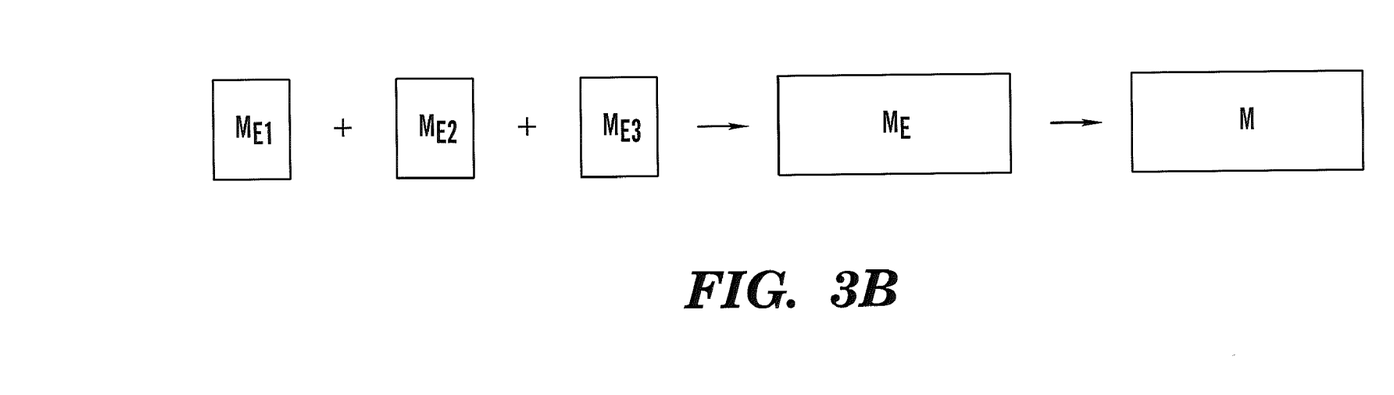
FIG. 3B depicts transformation of the encryption packets of FIG. 3A into the message of FIG. 3A, in accordance with embodiments of the present invention.

In FIG. 3A, a message M is encrypted into the encrypted message $M_E$. Then the encrypted message $M_E$, is packetized into encryption packets $M_{E1}$, $M_{E2}$, and $M_{E3}$. In FIG. 3B, the process of FIG. 3A is reversed such that the encryption packets $M_{E1}$, $M_{E2}$, and $M_{E3}$ are synthesized into the encrypted message $M_E$. Then the encrypted message $M_E$, is decrypted into the message M. Note that an "encrypted packet" (e.g., $M_{1E}$, $M_{2E}$, and $M_{3E}$ in FIGS. 2A-2B) results from packetization followed by encryption, while an "encryption packet" (e.g., $M_{E1}$, $M_{E2}$, and $M_{E3}$ in FIGS. 3A-3B) results from encryption followed by packetization.

Figure 4A:
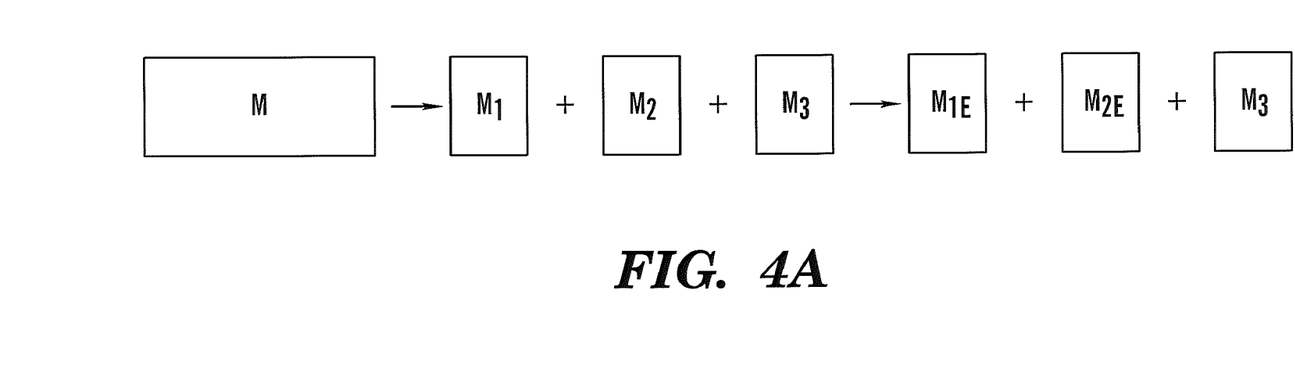
FIG. 4A depicts transformation of a portion of a message into encrypted packets, in accordance with embodiments of the present invention.
Figure 4B:
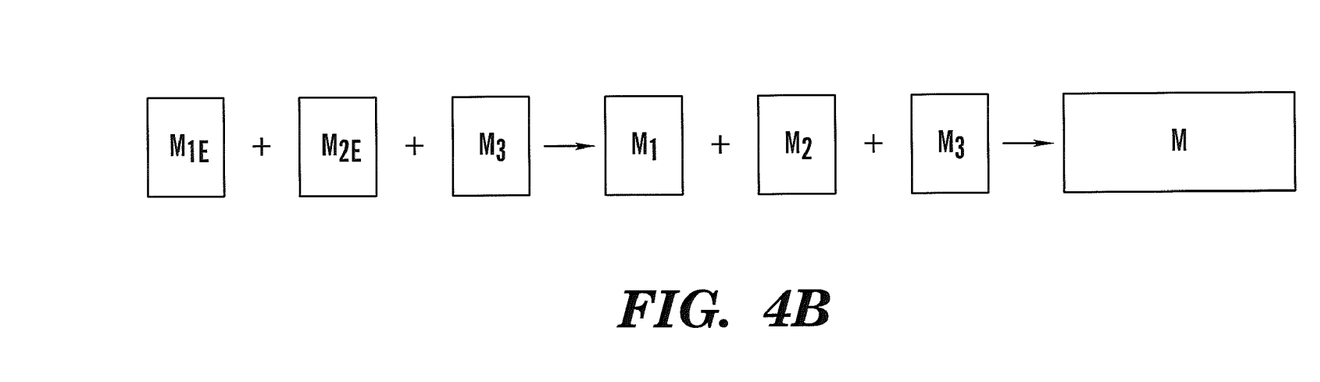
FIG. 4B depicts transformation of the packets generated as shown in FIG. 4A into the message of FIG. 4A, in accordance with embodiments of the present invention.
Figure 5A:
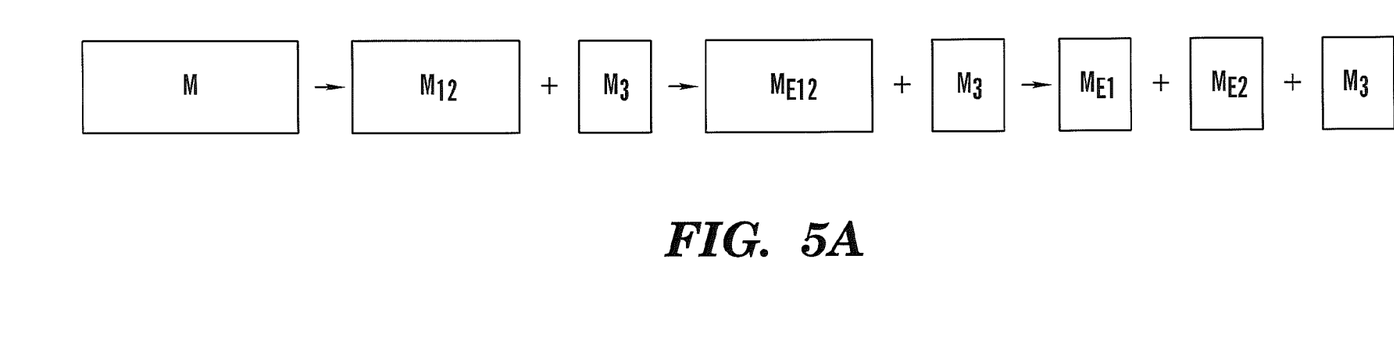
FIG. 5A depicts transformation of a portion of a message into encryption packets, in accordance with embodiments of the present invention.
Figure 5B:
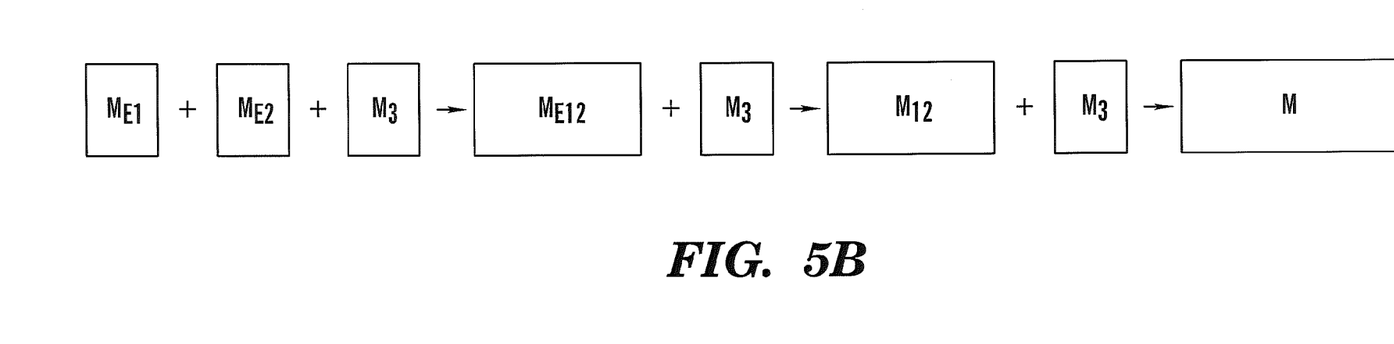
FIG. 5B depicts transformation of the packets generated as shown in FIG. 5A into the message of FIG. 5A, in accordance with embodiments of the present invention.

As shown in FIGS. 4A-4B and 5A-45B, use of encrypted packets or encryption packets for transmitting the message M from node 1 to node 2 may be structured such that all or some portions of the message M are encrypted. For example, if encrypted packets are used, all of the message packets $M_1$, $M_2$, and $M_3$ could be encrypted into the encrypted packets $M_{1E}$, $M_{2E}$, and $M_{3E}$ as shown in FIG. 2A, but as an alternative message packets $M_1$ and $M_2$ could encrypted into the encrypted packets $M_{1E}$ and $M_{2E}$ while the packet $M_3$ remains unencrypted as shown in FIG. 4A, with the reverse process of reconstructing the message M shown in FIG. 4B. As another example, if encryption packets are used, all three encryption packets $M_{E1}$, $M_{E2}$, and $M_{E3}$ could be generated as shown in FIG. 3A, but as an alternative the message M could be divided into an encrypted portion $M_{E12}$ (such as, inter alia, by forming an unencrypted portion $M_{12}$ followed by encrypting $M_{12}$ into $M_{E12}$) and an unencrypted portion $M_3$ such that $M_{E12}$ could be packetized into encryption packets $M_{E1}$ and $M_{E2}$ while unencrypted portion $M_3$ remains as unencrypted as shown in FIG. 5A, with the reverse process of reconstructing the message M shown in FIG. 5B. A packetization of the message M such as ($M_{1E}$, $M_{2E}$, and $M_3$), or ($M_{E1}$, $M_{E2}$, and $M_3$) is labeled herein as "hybrid packetization with encryption."

Packetizing $M_{E12}$ into $M_{E1}$ and $M_{E2}$ illustrate that an encrypted packet can be divided into at least two smaller encrypted packets. It is also within the scope of the present invention for unencrypted packets to be divided into at least two smaller unencrypted packets.

Although a message can be wholly expressed in one modality, packetization of a message lends itself optionally to a first message packet (encrypted or otherwise) of the message having content expressed in a first modality and a second message packet (encrypted or otherwise) of the message having content expressed in a second modality. The first modality could be a text modality, a visual modality, or an audio modality. The second modality could likewise be a text modality, a visual modality, or an audio modality provided that the second modality differs from the first modality.

Encryption may comprise single encryption or multiple encryption. A message packet is singly encrypted if it is encrypted once. A message packet is multiply encrypted if it is encrypted more than once. For example, a message packet that is doubly encrypted has been encrypted a first time according to a first encryption method or algorithm and subsequently encrypted a second time according to a second encryption method or algorithm.

Returning to FIG. 1, which illustrates transmitting a message from node 1 to node 2 with security protection by use of packetization and encryption, a message M at node 1 is packetized into the three message packets $M_1$, $M_2$, and $M_3$. The packet $M_1$ is transmitted from node 1 to node 2 via nodes 7 and 11. The packet $M_2$ is transmitted from node 1 to node 2 via nodes 8 and 12. The packet $M_3$ is transmitted from node 1 to node 2 via nodes 9 and 13.

Alternatively, any or all of the packets $M_1$, $M_2$, and $M_3$ could be transmitted from node 1 directly to node 2 without using any intermediate node in the transmission path from node 1 to node 2, such as the intermediate nodes 7 and 11 for transmission of packet $M_1$ from node 1 to node 2. Hence, a message transmitted from node 1 to node 2 is said to be "indirectly transmitted" from node 1 to node 2 when intermediate nodes are used in the transmission path from node 1 to node 2, and the message transmitted from node 1 to node 2 is said to be "directly transmitted" from node 1 to node 2 when intermediate nodes are not used in the transmission path from node 1 to node 2. Accordingly, "the word "transmitted" includes "indirectly transmitted" and "directly transmitted" as special cases. Similarly, a message received by node 2 from node 1 is said to be "indirectly received" by node 2 from node 1 when intermediate nodes are used in the transmission path from node 1 by node 2, and the message received by node 2 from node 1 is said to be "directly received" by node 2 from node 1 when intermediate nodes are not used in the transmission path from node 1 to node 2. Thus in FIG. 1, message packet $M_1$ is indirectly transmitted from node 1 to node 2, and indirectly received by node 2 from node 1, via intermediate nodes 7 and 11. Also in FIG. 1, message packet $M_1$ is directly transmitted from node 1 to node 19, and directly received by node 19 from node 1. Accordingly, "the word "received" includes "indirectly received" and "directly received" as special cases.

The packet $M_1$ could be replaced in FIG. 1 by an encrypted form as an encrypted packet (see FIGS. 2A-2B and 4A-4B, and accompanying description) or an encryption packet (see FIGS. 3A-3B and 5A-5B, and accompanying description).

If the packet $M_1$ is replaced in FIG. 1 by an encrypted packet, then packetization of the message M into packets $M_1$, $M_2$, and $M_3$ has preceded encryption into the encrypted packets $M_{1E}$, $M_{2E}$, and $M_{3E}$. Such packetization of the message M has occurred at the node 1 and the packet $M_1$ could be encrypted into the encrypted packet $M_{1E}$ at any of the nodes 1, 7, or 11. If $M_{1E}$ is generated at node 1, then $M_{1E}$ replaces $M_1$ in FIG. 1 between nodes 1 and 7, between nodes 7 and 11, and between nodes 11 and 2 (as well as between nodes 2 and 15, if relevant, as will be discussed infra). Similarly, if $M_{1E}$ is generated at node 7, then $M_{1E}$ replaces $M_1$ in FIG. 1 between nodes 7 and 11, and between nodes 11 and 2 (as well as between nodes 2 and 15, if relevant). Again similarly, if $M_{1E}$ is generated at node 11, then $M_{1E}$ replaces $M_1$ in FIG. 1 between nodes 11 and 2 (as well as between nodes 2 and 15, if relevant). Alternatively, each of $M_{1E}$, $M_{2E}$, and $M_{3E}$ may be generated independently at 1, 7, and 11 such that $M_{1E}$, $M_{2E}$, and $M_{3E}$ may be generated at the same node or at different nodes.

If the packet $M_1$ is replaced in FIG. 1 by an encryption packet, then encryption of the message M at the node 1 to generate the encrypted message $M_E$ has preceded packetization at the node 1 to generate the encryption packets $M_{E1}$, $M_{E2}$, and $M_{E3}$. Thus if the packet $M_1$ is replaced by an encryption packet in FIG. 1, then encryption packet $M_{E1}$ replaces $M_1$ in FIG. 1 between nodes 1 and 7, between nodes 7 and 11, and between nodes 11 and 2 (as well as between nodes 2 and 15, if relevant, as will be discussed infra).

The preceding discussion relating to message packet $M_1$ and the associated encrypted packet $M_{1E}$ as well as the associated encryption packet $M_{E1}$ applies analogously to message packet $M_2$ and the associated encrypted packet $M_{2E}$ as well as the associated encryption packet $M_{E2}$, and also applies analogously to message packet $M_3$ and the associated encrypted packet $M_{3E}$ as well as the associated encryption packet $M_{E3}$.

In a "single-source" embodiment, the message M exists at node 1, because the message M is generated at node 1. In a "distributed-source" embodiment, the message M exists at node 1, because some or all of the message packets $M_1$, $M_2$, and $M_3$ are transmitted to from nodes 3, 4, and 5, respectively, as shown in FIG. 1 and in accordance with various alternatives. In a first alternative, the message packets $M_1$, $M_2$, and $M_3$ could be transmitted to node 1 from nodes 3, 4, and 5, respectively, followed by packetization and encryption of $M_1$, $M_2$, and $M_3$ to generate $M_{1E}$, $M_{2E}$, and $M_{3E}$ as described supra, or followed by encryption and packetization of $M_1$, $M_2$, and $M_3$ to generate $M_{E1}$, $M_{E2}$, and $M_{E3}$ as described supra. In a second alternative, the encrypted packets $M_{1E}$, $M_{2E}$, and $M_{3E}$ could be transmitted to node 1 from nodes 3, 4, and 5, respectively, followed by transmission of $M_{1E}$, $M_{2E}$, and $M_{3E}$ to node 2 by any of the nodal paths described supra. In a third alternative, the encryption packets $M_{E1}$, $M_{E2}$, and $M_{E3}$ could be transmitted to node 1 from nodes 3, 4, and 5, respectively, followed by transmission of $M_{E1}$, $M_{E2}$, and $M_{E3}$ to node 2 by any of the nodal paths described supra. In a fourth alternative, node 1 receives from nodes 3, 4, and 5 a combination of encrypted and unencrypted variants of packets $M_1$, $M_2$, and $M_3$ in analogy with the hybrid packetization with encryption described supra. In a fifth alternative, some but not all of $M_1$, $M_2$, and $M_3$ (or $M_{1E}$, $M_{2E}$, and $M_{3E}$; or $M_{E1}$, $M_{E2}$, and $M_{E3}$) are generated at node 2 and a remainder of $M_1$, $M_2$, and $M_3$ (or $M_{1E}$, $M_{2E}$, and $M_{3E}$; or $M_{E1}$, $M_{E2}$, and $M_{E3}$) are transmitted to node 1 from a subset of nodes 3, 4, and 5.

Thus for either the single-source embodiment or the distributed-source embodiment, the node 1 "gains" message packets by: generating of the message packets (at node 1); receiving (by node 1) the message packets from nodes 3, 4, and 5; or a combination of said generating and said receiving.

In FIG. 1, node 2 receives: the message packets ($M_1$, $M_2$, and $M_3$); or ($M_{1E}$, $M_{2E}$, and $M_{3E}$); or ($M_{E1}$, $M_{E2}$, and $M_{E3}$); or a hybrid packetization with encryption such as ($M_{1E}$, $M_{2E}$, and $M_3$) or ($M_{E1}$, $M_{E2}$, and $M_3$); etc. If node 2 has received all message packets associated with the message M, then node 2 may generate the message using all of said message packets. If all of the message packets received by node 2 are the encrypted packets $M_{1E}$, $M_{2E}$, and $M_{3E}$, then the node 2 could generate the message M in accordance with the procedure described supra in conjunction with FIG. 2B; i.e., by decrypting $M_{1E}$, $M_{2E}$, and $M_{3E}$ into $M_1$, $M_2$, and $M_3$, followed by synthesizing $M_1$, $M_2$, and $M_3$ into the message M. With hybrid packetization with encryption such as with $M_{1E}$, $M_{2E}$, and $M_3$ (see FIG. 4B), the preceding procedure is modified to decrypt only those packets that are encrypted, so that $M_{1E}$ and $M_{2E}$ would be decrypted into $M_1$ and $M_2$, followed by synthesizing $M_1$, $M_2$, and $M_3$ into the message M. If all of the message packets received by node 2 are the encryption packets $M_{E1}$, $M_{E2}$, and $M_{E3}$, then the node 2 could generate the message M in accordance with the procedure described supra in conjunction with FIG. 3B; i.e., by synthesizing $M_{E1}$, $M_{E2}$, and $M_{E3}$ into $M_E$, followed by decrypting $M_E$ into the message M. With hybrid packetization with encryption such as with $M_{E1}$, $M_{E2}$, and $M_3$ (see FIG. 5B), the preceding procedure is modified to synthesize only encryption packets, so that $M_{E1}$ and $M_{E2}$ would be synthesized into encrypted portion $M_{E12}$, followed by synthesizing decrypting $M_{E12}$ into unencrypted portion $M_{12}$ and synthesizing $M_{12}$ and $M_3$ into the message M.

While it is natural for node 2, as a destination of the message M, to decrypt message packets, any node of the nodal network 100 may decrypt a message packet. For example node 11 may receive message packet $M_1$ in an encrypted form (e.g., $M_{1E}$ or $M_{E1}$) and then decrypt $M_{1E}$ or $M_{E1}$ into $M_1$, followed by re-encryption of $M_1$ into a different encrypted form, or followed by transmission of $M_1$ from node 11 to node 19 where $M_1$ is re-encrypted into the same encrypted form as previously or into a different encrypted form, followed by transmission of message packet $M_1$ (in an encrypted form) from node 19 to node 2.

After the message M is generated at node 2, a test at node 2 may be performed to determine whether M is really the message. An example of such a test is a "Make Sense" test which is an examination of M to determine whether M makes sense to a person, algorithm, machine, etc. If M makes sense then M is considered to be the message. M is considered as making sense to a person if M is intelligible to the person. M is considered as making sense to an algorithm if the algorithm processes the message as input, and is able to successfully execute and generate meaningful output. M is considered as making sense to a machine if the M is fed into the machine, the machine processes M, and the machine properly performs a function based on M (e.g., making a product that is a function of M). If M passes the Make Sense test then M is the message. If M does not pass the Make Sense test then M is not the message.

Another example of a test to determine whether M is really the message is an "Algorithmic" test, which performs a logical test on the message. For example, the Algorithmic test could be used to determine whether M contains a predetermined number of binary bits. As another example, the Algorithmic test could be to determine whether M includes a predetermined sequence of bits (e.g., "0011110101").

In addition to generating M and determining that M is the message, the node 2 could send portions of M (e.g., $M_1$, $M_2$, $M_3$, $M_{1E}$, $M_{2E}$, $M_{3E}$, $M_{E1}$, $M_{E2}$, $M_{E3}$) to other nodes of the nodal network 100, which could deter uninvited third-party eavesdroppers from knowing that the message M has been received at the node 2. This is illustrated by in FIG. 1 by transmission of message packets M1 and M2 from node 2 to nodes 15 and 16 respectively. Generally, any of $M_1$, $M_2$, $M_3$, $M_{1E}$, $M_{2E}$, $M_{3E}$, $M_{E1}$, $M_{E2}$, $M_{E3}$ could be transmitted from node 2 to any node(s) of the nodal network 100. Additionally for decoy purposes or for any other purpose, any given node of the nodal network 100 could send any portion of M that is accessible to the given node, to any node(s) of the nodal network 100. As an example, although node 12 is sending message portion $M_2$ (or alternatively $M_{2E}$ or $M_{E2}$) to the node 2 which is the intended destination of the message M, node 12 is also sending message portion $M_2$ (or alternatively ($M_{2E}$ or $M_{E2}$) to node 13 (for decoy purposes), and node 13 is sending message portion $M_2$ (or alternatively ($M_{2E}$ or $M_{E2}$) to node 14 (also for decoy purposes). As another example, although node 1 (which may be the source of the message M) is sending message portion $M_1$ (or alternatively ($M_{1E}$ or $M_{E1}$) to the node 7 for eventual transmission to node 2, the node 1 is also sending message portion $M_1$ (or alternatively ($M_{1E}$ or $M_{E1}$) to node 19 (for decoy purposes).

A message packet can be killed at any node of the nodal network 100. For example, the message M and message packets $M_1$, $M_2$, and $M_3$ (or $M_{1E}$, $M_{2E}$, and $M_{3E}$; or $M_{E1}$, $M_{E2}$, and $M_{E3}$, etc.) could be killed at node 2 after the message M is generated. As another example, node 14 could kill message packet $M_2$ (or $M_{2E}$, $M_{E2}$, etc.).

Any node of the nodal network 100 may add content to a message packet which increases the size of the message packet. Any node of the nodal network 100 may delete content from a message packet which decreases the size of the message packet.

FIG. 1 shows dummy message packets $D_1$, $D_2$, $D_3$, $D_4$, $D_5$, and $D_6$. A dummy message packet is packet of information, data, etc., wherein the message M does not comprise the dummy packet. Each of said dummy packets may be encrypted or unencrypted. The dummy packet $D_1$ is transmitted from node 1 to node 2 via nodes 10 and 14. The dummy packet $D_2$ is transmitted from node 20 to node 1. The dummy packet $D_3$ is transmitted from node 2 to node 18. The dummy packet $D_4$ is transmitted from node 19 to node 3. The dummy packet $D_5$ is transmitted from node 3 to node 19. The dummy packet $D_6$ is transmitted from node 9 to node 1. Dummy packets serve to distract uninvited third-party eavesdroppers who desire to learn the content of the message M. The dummy packet $D_1$ at node 1 may be gained at node 1 by being generated at node 1 or by being transmitted to node 1 from another node of the nodal network 100. Any of the dummy packets $D_1$, $D_2$, $D_3$, $D_4$, $D_5$, and $D_6$ may be encrypted at any node having access to said dummy packets. Any of the dummy packets $D_1$, $D_2$, $D_3$, $D_4$, $D_5$, and $D_6$, if encrypted, may be decrypted at any node having access to said encrypted dummy packets. Any of the dummy packets $D_1$, $D_2$, $D_3$, $D_4$, $D_5$, and $D_6$ may be killed at any node having access to said dummy packets.

Figure 6:
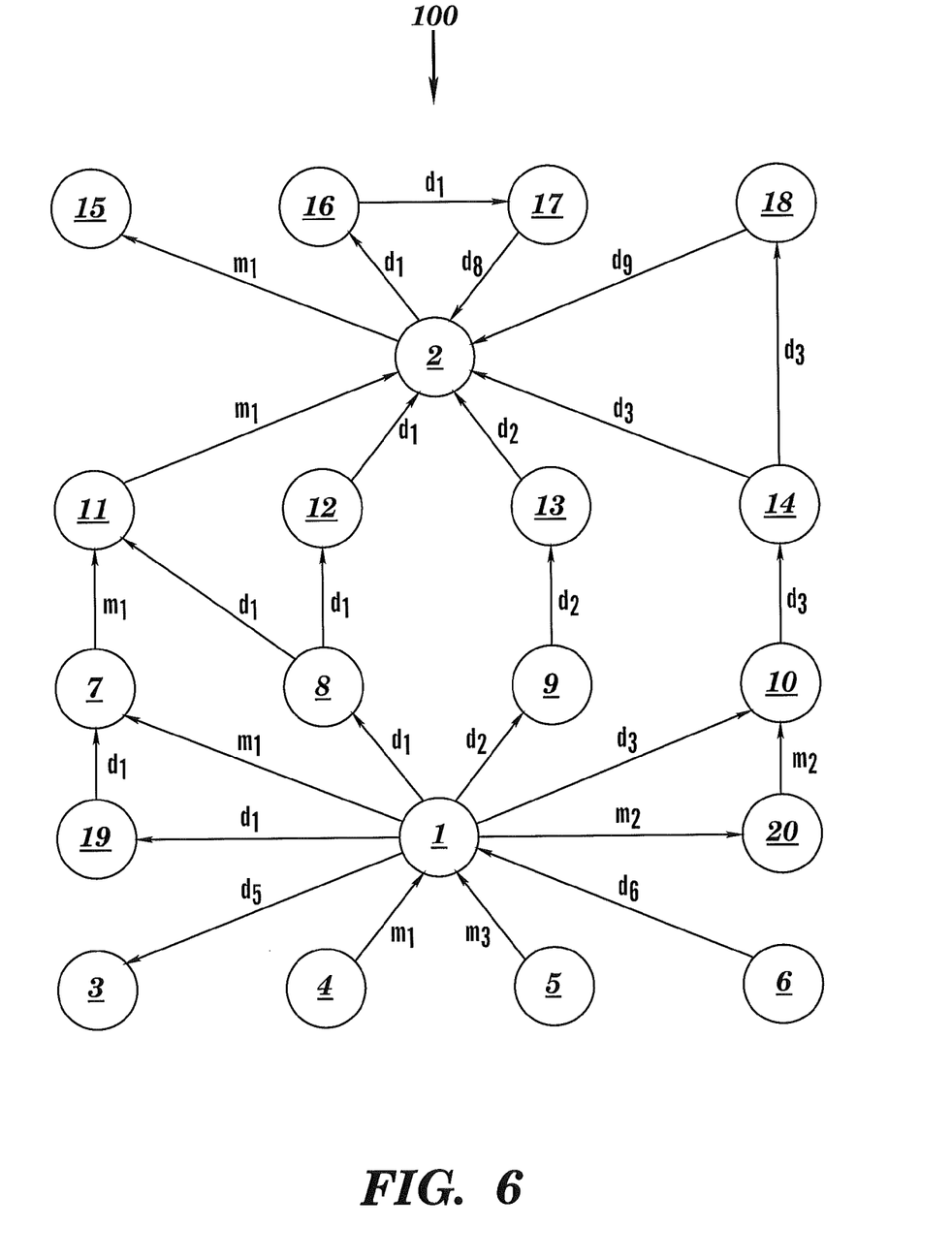
FIG. 6 depicts the nodal network of FIG. 1 with true messages and dummy messages transmitted between nodes of the nodal network, in accordance with embodiments of the present invention.

FIG. 6 depicts the nodal network 100 of FIG. 1 with true messages and dummy messages transmitted between nodes of the nodal network, in accordance with embodiments of the present invention. FIG. 6 illustrates transmission of a "true message" $m_1$ from node 1 to node 2, as well as transmission of "dummy messages" $d_1$, $d_2$, and $d_3$ from node 1 to node 2. A "true message" from node 1 to node 2 is a message intended by node 1 to be received and understood at node 2.

A "true message" in conjunction with FIG. 6 is analogous to a "message" in conjunction with FIG. 1. A dummy message in conjunction with FIG. 6 is a decoy message intended to distract an uninvited third-party eavesdropper from discovering the content of a true message. In FIG. 6, the dummy messages comprising $d_1$, $d_2$, and $d_3$ (and other dummy messages as will be identified and discussed infra) are intended to distract an uninvited third-party eavesdropper from discovering the true message $m_1$ and other true messages in FIG. 1 that will be identified and discussed infra. The idea behind the node 1 sending the true message $m_1$ and dummy messages (e.g., $d_1$, $d_2$, $d_3$, and also $d_5$ as will be discussed infra) is that an uninvited third-party eavesdropper attempting to discover or learn the content of the true message $m_1$ will be unable, or find it difficult, to distinguish between the true message $m_1$ and the dummy message. Thus, if many dummy messages are transmitted between nodes of the nodal network 100, the task by an uninvited third-party eavesdropper of attempting to discover or learn the content of the true message $m_1$ will be like trying to "find a needle in a haystack."

For the subsequent discussion of FIG. 6 and for the claims herein, the terms "transmitted", "directly transmitted", "indirectly transmitted", "received", "directly received", and "indirectly received" have the same or analogous meanings in conjunction with FIG. 6 as described supra in conjunction with FIG. 1.

In FIG. 6, node 1 transmits the true message $m_1$ from node 1 to node 2 via nodes 7 and 11. Alternatively, node 1 could directly transmit the true message $m_1$ from node 1 to node 2. Additionally node 1 directly transmits a true message $m_2$ to node 20, and node 1 indirectly transmits the true message $m_2$ to node 10 via node 20. While node 1 could generate true messages $m_1$ and $m_2$, node 1 could alternatively receive true messages $m_1$ and/or $m_2$ from other nodes of the nodal network 100. FIG. 1 shows that node 1 receives the true message $m_1$ from node 4, and also receives a true message $m_3$ from node 5.

Node 1 indirectly transmits the dummy message $d_1$ from node 1 to node 2 via nodes 8 and 12, but could alternatively directly transmit the dummy message $d_1$ from node 1 to node 2. Node 1 indirectly transmits the dummy message $d_2$ from node 1 to node 2 via nodes 9 and 13, but could alternatively directly transmit the dummy message $d_2$ from node 1 to node 2. Node 1 indirectly transmits the dummy message $d_3$ from node 1 to node 2 via nodes 10 and 14, but could alternatively directly transmit the dummy message $d_3$ from node 1 to node 2. Node 14 transmits the dummy message $d_3$ both node 2 and node 18. Node 1 directly transmits the dummy message $d_1$ to node 19, and indirectly transmits the dummy message $d_1$ from node 1 to node 7 via node 19. Node 1 directly transmits the dummy message $d_3$ to node 10, and node 1 directly transmits the dummy message $d_5$ to node 3. Node 1 receives the dummy message $d_6$ from node 6.

Any of the true messages and dummy messages transmitted and/or received by node 1 (or by any other node of the nodal network 100 may be encrypted.

Node 2 receives from node 1 the true message $m_1$ and the dummy messages $d_1$, $d_2$, and $d_3$ as described supra. Node 2 also receives dummy messages $d_8$ and $d_9$ from nodes 17 and 18, respectively. Node 2 transmits the dummy message $d_1$ directly to node 16, and indirectly to node 17 via node 16.

If the true message $m_1$ is encrypted, then node 2 may decrypt the true message $m_1$. Node 2 may distinguish between the true message $m_1$ and the dummy messages (e.g., $d_1$, $d_2$, $d_3$, $d_8$, and $d_9$) by such methods or techniques as, inter alia, a Make Sense test or an Algorithmic test, as described supra in conjunction with FIG. 1. Node 2 may read and/or interpret the true message $m_1$. Node 2 may retain the true message $m_1$, transmit the true message $m_1$ to another node (e.g., to node 15 as shown in FIG. 6), or kill true message $m_1$.

Any given node of the nodal network 100 may kill: the true message $m_1$; and/or any other true message accessible to the given node; and/or any dummy message accessible to the given node.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for secure communication of a message, comprising:
    providing a message on an Internet readable medium, the message comprising a plurality of message packets, the plurality of message packets including at least a first message packet and a second message packet;
    providing a nodal network comprising a plurality of nodes, the plurality of nodes including at least a first node, a second node, a third node, a fourth node, a fifth node, and a message destination node, wherein the plurality of nodes are at least one of a computer and electrical component that execute nodal operations, the nodal operations being capable of execution on said message packets at said plurality of nodes;
    gaining, by the first node of said plurality of nodes comprising the nodal network, the first message packet and the second message packet;
    processing, by the first node, the first message packet and the second message packet;
    transmitting, by the first node, a first processed message packet as processed by the first node to the second node and the third node, wherein the first processed message transmitted to at least one of the second node and the third node is a first decoy message having the same content as the first processed message packet;
    gaining, by at least one of the second node and the third node, the first processed message as processed by the first node;
    processing, by at least one of the second node and the third node, the first processed message;
    gaining, by at least one of the second node and the third node, the first decoy message as transmitted by the first node;
    killing the first decoy message at one of the second node and the third node;
    transmitting, by the first node, a second processed message packet to the fourth node and the fifth node, wherein the second processed message packet transmitted to at least one of the fourth node and the fifth node is a second decoy message having the same content as the second processed message;
    gaining, by at least one of the fourth node and the fifth node, the second processed message as processed by the first node;
    processing, by at least one of the fourth node and the fifth node, the second processed message;
    gaining, by at least one of the fourth node and the fifth node, the second decoy message as transmitted by the first node;
    killing the second decoy message at one of the fourth node and the fifth node;
    transmitting, by at least one of the second node and the third node, the first processed message packet to the message destination node of the nodal network;
    transmitting, by at least one of the fourth node and the fifth node, the second processed message packet to the message destination node;
    receiving, by the message destination node of said nodal network, the first processed message packet as transmitted by at least one of the second node and the third node;
    receiving, by the message destination node, the second processed message as transmitted by at least one of the fourth node and the fifth node; and
    processing the first processed message packet and the second processed message packet to provide a reproduced message.

2. The method of claim 1, wherein processing comprises executing at least one nodal operation, wherein nodal operations comprise: encrypting, decrypting, copying, dividing, combining, adding, deleting, no action, and combinations thereof.

3. The method of claim 1, wherein gaining is generating or receiving.

4. The method of claim 1, wherein gaining the message packet comprises gaining the message packet as singly encrypted, and wherein processing the message packet comprises encrypting the message packet resulting in formation of the message packet as doubly encrypted.

5. The method of claim 1, wherein the message packets may comprise true message packets and dummy message packets.

6. The method of claim 1, further comprising performing a test on the reproduced message.

7. The method of claim 1, wherein the first message packet and the second message packet consist of N message packets, and wherein gaining the first message packet and gaining the second message packet collectively comprises:
    receiving by the first node from at least two nodes of the plurality of nodes M message packets of the N message packets such than $1 \leq M < N$ and such that the M message are received by the first node as encrypted;
    generating by the first node a remaining N−M message packets of the N message packets; and
    encrypting by the first node the remaining N−M message packets.

8. The method of claim 1, wherein the first message packet has content expressed in a first modality, and wherein the second message packet has content expressed in a second modality that differs from the first modality further wherein the modality is selected from the group consisting of a text modality, a visual modality, and an audio modality.

9. The method of claim 1, wherein the nodal network comprises a first network selected from the group consisting of an Internet nodal network, a postal nodal network, a parcel nodal network, a wireless nodal network, a vehicle communication network, an animal communication system, a multimedia nodal network, and combinations thereof, and wherein the first network comprises the plurality of nodes.

10. A nodal network for secure communication of a message, said nodal network comprising a plurality of nodes, said message including a first message packet and a second message packet, wherein the plurality of nodes are at least one of a computer and electrical component that execute nodal operations, the nodal operations being capable of execution on said message packets at said plurality of nodes, said plurality of nodes comprising a first node, said first node adapted to gain the first message packet and the second message packet as encrypted, process the first message packet, transmit a first processed message packet to a at least one of a second node and a third node, kill the first message packet, transmit a second processed packet to at least one of a fourth node and a fifth node, wherein the nodal network further includes a message destination node that reproduces the message after processing the first processed message packet and the second message packet.

11. The nodal network of claim 10, wherein to gain the first message by the first node comprises to generate the first message packet by the first node and to encrypt the first message packet by the first node or to receive, by the first node, the first message packet as encrypted.

12. The nodal network of claim 10, wherein to process the first message packet by the first node comprises the execution of at least one nodal operation, wherein nodal operations comprise: to transmit the first message packet from the first node to the second node of the plurality of nodes; to kill the first message packet; to divide the first message packet by the first node into at least two smaller message packets; to add message content to the first message packet by the first node, which increases the size of the first message packet; to delete message content from the first message packet by the first node, which decreases the size of the first message packet; and to decrypt the first message packet by the first node.

13. The nodal network of claim 10, wherein to gain the first message packet by the first node comprises to receive the first message packet by the first node or to generate the first message packet by the first node and to encrypt the first message packet by the first node.

14. The nodal network of claim 10, wherein to gain the first message packet by the first node comprises to gain by the first node the first message packet as singly encrypted, and wherein to process the first message packet by the first node comprises to encrypt the first message packet by the first node, resulting in formation of the first message packet as doubly encrypted.

15. The nodal network of claim 10, wherein the first node is further adapted to gain at least one other message packet as encrypted and to process the at least one other message packet.

16. The nodal network of claim 10 wherein the second node is adapted to process the first message packet such that the first message packet are processed and synthesized such that the message is generated.

17. The nodal network of claim 10, wherein the first message packet and the second message packet consist of N message packets, and wherein to gain the first message packet by the first node and to gain the second message packet by the first node collectively comprises:
  to receive by the first node from at least two of nodes of the plurality of nodes M message packets of the N message packets such than $1 \leq M<N$ and such that the M message are received by the first node as encrypted;
  to generate by the first node a remaining N–M message packets of the N message packets; and
  to encrypt by the first node the remaining N–M message packets.

18. The nodal network of claim 10,
  wherein to gain the first message packet by the first node and to gain the second message packet by the first node collectively comprises to receive by the first node from at least two nodes of the plurality of nodes the first message packet and the second message packet; and
  wherein to process the first message packet by the first node and to process the second message packet by the first node collectively comprises to generate the message by the first node and to utilize the first message packet and the second message packet by the first node.

19. The nodal network of claim 10, wherein the first message packet and the second message packet are adapted to be transmitted through the at least two nodes to the first node from a second node of the plurality of nodes.

20. The nodal network of claim 10, wherein to process the first message packet by the first node and to process the second message packet by the first node collectively comprises:
  to decrypt by the first node the first message packet and the second message packet; and
  to synthesize by the first node the decrypted message packets to generate the message.

21. The nodal network of claim 10, wherein to process the first message packet by the first node and to process the second message packet by the first node collectively comprises:
  to synthesize the first message packet by the first node and the second message packet by the first node to generate an encrypted form of the message; and
  to decrypt by the first node the encrypted form of the message to generate the message.

22. The nodal network of claim 10, wherein the first node is further adapted to gain a dummy packet and to process the dummy packet, further wherein to gain the dummy packet by the first node comprises to receive the dummy packet by the first node from a second node of the plurality of nodes or to generate the dummy packet by the first node, further wherein to process the dummy packet by the first node comprises to transmit the dummy packet from the first node to a second node of the plurality of nodes or to encrypt the dummy packet by the first node.

23. The nodal network of claim 10, wherein the first message packet has content expressed in a first modality, and wherein the second message packet has content expressed in a second modality that differs from the first modality, further wherein modality is selected from the group consisting of a text modality, a visual modality, and an audio modality.

24. The nodal network of claim 10, wherein the nodal network comprises a first network selected from the group consisting of an Internet nodal network, a postal nodal network, a parcel nodal network, a wireless nodal network, a vehicle communication network, an animal communication system, a multimedia nodal network, and combinations thereof, and wherein the first network comprises the plurality of nodes.

25. A method for secure communication of a message on an Internet readable medium, the method comprising:
  providing a true message on an Internet readable medium, the true message comprising a plurality of message packets, the plurality of message packets including at least a first true message packet and a second true message packet;
  providing a dummy message on the Internet readable medium, the dummy message comprising a plurality of dummy message packets, the plurality of dummy message packets including at least a first dummy message packet and a second dummy message packet;
  providing a nodal network comprising a plurality of nodes, the plurality of nodes including at least a first node, a second node, a third node, a fourth node, a fifth node, and a message destination node, wherein the plurality of nodes are at least one of a computer and electrical component that execute nodal operations, the nodal operations being capable of execution on said message packets;

receiving, by the first node of the plurality of nodes of the nodal network, the first true message and the second true message;

receiving, by the first node, the first dummy message and the second dummy message;

processing, by the first node, the first true message packet and the second true message packet;

transmitting, by the first node, a first processed true message packet as processed by the first node to at least one of the second node and the third node;

transmitting, by the first node, a first dummy message to at least one of the second node and the third node, wherein the first dummy message transmitted to at least one of the second node and the third node has different content than the first processed true message;

gaining, by at least one of the second node and the third node, the first processed true message as processed by the first node;

processing, by at least one of the second node and the third node, the first processed true message;

gaining, by at least one of the second node and the third node, the first dummy message as transmitted by the first node;

killing the first dummy message at one of the second node and the third node;

transmitting, by the first node, a second processed true message packet to at least one of the fourth node and the fifth node;

transmitting, by the first node, a second dummy message to at least one of the fourth node and the fifth node, wherein the second dummy message packet has different content than the second processed true message;

gaining, by at least one of the fourth node and the fifth node, the second processed true message as processed by the first node;

processing, by at least one of the fourth node and the fifth node, the second processed true message;

gaining, by at least one of the fourth node and the fifth node, the second dummy message as transmitted by the first node;

killing the second dummy message at one of the fourth node and the fifth node;

transmitting, by at least one of the second node and the third node, the first processed true message packet to the message destination node of the nodal network;

transmitting, by at least one of the fourth node and the fifth node, the second processed true message packet to the message destination node;

receiving, by the message destination node of said nodal network, the first processed true message packet as transmitted by at least one of the second node and the third node;

receiving, by the message destination node, the second processed true message as transmitted by at least one of the fourth node and the fifth node; and processing the first processed true message packet and the second processed true message packet to provide a reproduced message.

26. The method of claim 25, wherein the first true message is encrypted and wherein processing the first true message includes decrypting the first true message.

27. The method of claim 25, wherein processing the first true message comprises executing at least one nodal operation, wherein nodal operations comprise: reading the first true message; transmitting the first true message, and killing the first true message.

28. The method of claim 25, wherein the nodal network comprises a first network selected from the group consisting of an Internet nodal network, a postal nodal network, a parcel nodal network, a wireless nodal network, a vehicle communication network, an animal communication system, a multimedia nodal network, and combinations thereof, and wherein the first network comprises the plurality of nodes.

* * * * *